United States Patent
Wang et al.

(10) Patent No.: US 10,754,166 B2
(45) Date of Patent: Aug. 25, 2020

(54) OPTICAL STRUCTURE

(71) Applicants: Mettler-Toledo Instruments (Shanghai) Co. Ltd, Shanghai (CN); Mettler-Toledo International Trading (Shanghai) Co. Ltd, Shanghai (CN)

(72) Inventors: Changlin Wang, Shanghai (CN); Hong Zhu, Shanghai (CN); Fengjin Wang, Shanghai (CN); Min Xu, Shanghai (CN); Cong Wang, Shanghai (CN)

(73) Assignees: Mettler-Toledo Instruments (Shanghai) Co. Ltd, Shanghai (CN); Mettler-Toledo International Trading (Shanghai) Co. Ltd, Shanghai (CN)

( * ) Notice: Subject to any disclaimer, the term of this patent is extended or adjusted under 35 U.S.C. 154(b) by 0 days.

(21) Appl. No.: 16/414,282

(22) Filed: May 16, 2019

(65) Prior Publication Data
US 2019/0355870 A1    Nov. 21, 2019

(51) Int. Cl.
*G02B 27/14*    (2006.01)

(52) U.S. Cl.
CPC .................. *G02B 27/141* (2013.01)

(58) Field of Classification Search
None
See application file for complete search history.

(56) References Cited

U.S. PATENT DOCUMENTS 7,543,959 B2 *  6/2009  Bierhuizen ............ H04N 9/315
                                                    257/98

\* cited by examiner

*Primary Examiner* — Thien F Tran
(74) *Attorney, Agent, or Firm* — Standley Law Group LLP; Jeffrey S. Standley; Stephen L. Grant (57) ABSTRACT

An optical structure has a cavity (1) with an opening provided at one end and a first through hole or first gap (21) provided at the end opposite the opening. The cavity is further provided internally with a beam splitter or a dichroic mirror (4). A first LED (31) emits light into the cavity through the first through hole or the first gap, which passes directly passing through the beam splitter or dichroic mirror and exits from the opening of the cavity A second LED (32) emits light into the cavity through a second through hole or second gap (22) in a side of the cavity, which is reflected by the beam splitter or dichroic mirror. It is then fused with the light emitted by the first LED. The light emitted by the respective LEDs have an identical optical path length to the beam splitter or the dichroic mirror.

15 Claims, 6 Drawing Sheets

OPTICAL STRUCTURE

CROSS-REFERENCE TO RELATED APPLICATIONS

This application claims priority to Chinese Application No. CN 201810483851.4, filed on 19 May 2018, which is incorporated by reference as if fully recited herein.

TECHNICAL FIELD

This invention relates to an optical structure and in particular to an optical structure in a sensor.

BACKGROUND ART

In a chroma sensor or a turbidity sensor, an optical path needs to fuse light of two different wavelengths. In the process of fusing light in the prior art, the light transmission direction of different light sources has to be adjusted through a combination of multiple sets of prisms, in order to realize light fusion into one and the same optical path. However, such a design makes the light emitted by different light sources experience different optical path lengths before fusion, thus affecting the effect of light fusion, and this design uses relatively more prisms and/or lenses, making the optical structure complicated.

In other designs, optical fibers are used to transmit light from different light sources, for example, light from two light sources is fused and output using a Y-type optical fibre. The introduction of optical fibres solves the problem of different optical path lengths, but reduces the efficiency of light fusion. Moreover, optical fibres are fragile and expensive. In addition, since the sensor needs to be compact, the optical fibre is difficult to install and is not suitable to be used in a large amount in the sensor.

The technical problem to be solved is to overcome the defects that the optical structure of the sensor in the prior art is too complex and the light fusion efficiency is low due to different optical path lengths, and to provide a new optical structure, which realizes the consistency of optical path lengths and light fusion through a compact cavity structure design.

SUMMARY

The invention solves the above technical problems through the following technical solution:

The invention provides an optical structure, characterized by comprising: a cavity with an opening provided at one end and a first through hole or first gap provided at the other end opposite the opening; a first LED, light emitted by the first LED entering the cavity through the first through hole or the first gap; and a second LED, light emitted by the second LED entering the cavity through a second through hole or second gap that is provided in one side of the cavity, the cavity being further internally provided with a beam splitter or a dichroic mirror, the light emitted by the first LED directly passing through the beam splitter or dichroic mirror and exiting from the opening of the cavity, the light emitted by the second LED exiting from the opening of the cavity after being reflected by the beam splitter or dichroic mirror and then fused with the light emitted by the first LED, wherein optical path lengths of the light emitted from the first LED and the second LED to the beam splitter or the dichroic mirror are the same.

The beam splitter or dichroic mirror can merge light beams in two different directions into one beam. In the present invention, the feature of the beam splitter or the dichroic mirror is used to merge the light of different LEDs, thereby simplifying the optical structure in the sensor.

The light beams enter the beam splitter or the dichroic mirror perpendicularly to each other and are output in one beam. To this end, one end and one side of the cavity are constructed into such a structure that the LED light beams enter the beam splitter or the dichroic mirror perpendicularly to each other, and the optical path control is also easy to realize in this arrangement, so that the optical path lengths of the two LED light beams before light fusion can be the same.

Preferably, the optical structure further comprises a photodiode, and the side of the cavity is further provided with a third through hole where the photodiode is disposed; or the photodiode is disposed at the second gap and at a set distance from the second LED.

Preferably, a light barrier is disposed between the photodiode and the second LED to keep a photosensitive surface of the photodiode from direct exposure to the light emitted by the second LED.

The photodiode is used for receiving the light emitted from the first LED through the beam splitter or the dichroic mirror, or the light emitted from the second LED after being reflected by the beam splitter or the dichroic mirror and transmitted to the side wall of the cavity.

The invention uses the photodiode to detect the light intensity in the cavity and thereby adjusts the light intensity of the LEDs or corrects the measurement of the sensor.

Preferably, the first LED and the second LED are each an LED circuit board.

Preferably, the second LED and the photodiode are integrated on one and the same LED circuit board.

Preferably, the opening of the cavity is further provided with a lens or a lens set that converts the fused light into parallel light or condensed light.

In the invention, the lens is further utilized to adjust the form of the merged light beam.

Preferably, the lens or lens set is removably disposed at the opening.

Preferably, the lens or lens set is disposed over a threaded connector which is connected at the opening via a threaded connection.

Preferably, the first LED and the second LED can emit light at the same time or at different times. The wavelengths of the light emitted by the first LED and the second LED are different from each other. When the optical structure is used in a sensor, the advantage of light emitting at different times is that signals detected subsequently correspond to different wavelengths at different times, and no special device is needed to distinguish different wavelengths.

Preferably, the optical structure is applicable to a sensor, particularly to a chroma sensor or a turbidity sensor or a chroma/turbidity two-in-one sensor.

The inventive concept provides several positive effects. The property of the beam splitter or dichroic mirror is utilized such that a compact cavity structure design is also realized while optical distance consistency and light fusion are achieved in the sensor. Compared with the conventional design of multiple sets of prisms or optical fibres, the optical path design of the invention has higher reliability, higher light efficiency and lower cost and is convenient to process and adjust. The cavity design of the present invention further incorporates light detection to intelligently adjust the light intensity of the light source or intelligently correct the measurement of the sensor.

BRIEF DESCRIPTION OF THE DRAWINGS

The inventive concept will be better understood when reference is made to the following tables and figures that are appended hereto, wherein identical part numbers are used to identify identical parts and wherein.

DETAILED DESCRIPTION

The present invention will be further described below by way of examples, but the present invention is not therefore limited to the scope of the described embodiments.

According to the invention, the property of a beam splitter or dichroic mirror is utilized to merge light emitted by different LEDs in two different directions, particularly in two different directions perpendicular to each other, so that the optical structure for light fusion in the sensor is simplified, and a compact optical structure is also realized.

The implementation of the present invention will be illustrated by way of examples via the following embodiments.

Embodiment 1

Figure 1:
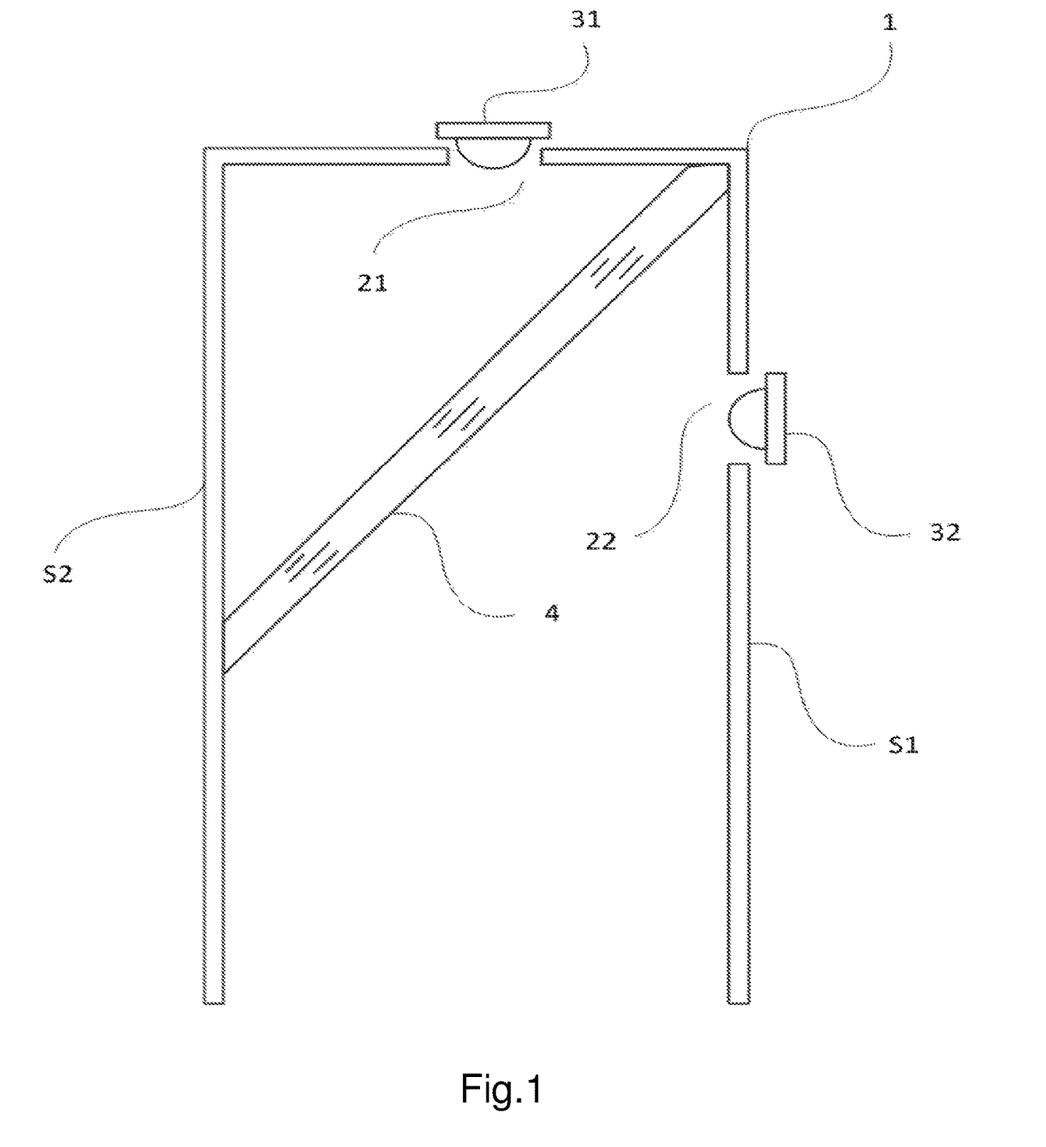
FIG. 1 is a schematic cross-sectional view of an optical structure according to a first embodiment.

As shown in FIG. 1, the optical structure in this embodiment includes a cavity 1 in the shape of a rectangular parallelepiped. One end of the cavity 1 is open, and an end face of the other end is provided with a through hole 21. A red LED 31 is provided at the through hole 21. The light emitted from the LED 31 is emitted toward the opening of the cavity 1 through the through hole 21.

One side S1 of the four sides of the cavity 1 is provided with a through hole 22. A blue LED 32 is provided at the through hole 22. The light emitted from the LED 32 is emitted through the through hole 22 toward one side S2.

As shown in FIG. 1, a dichroic mirror 4 is disposed in the cavity 1. In this embodiment, the dichroic mirror 4 can allow the red light emitted by the LED 31 to directly pass through the dichroic mirror 4, but reflect the blue light emitted by the LED 32 by 90 degrees. Then, the red light directly passed through and the blue light reflected by 90 degrees are merged, after which the merged light exits from the opening of the cavity 1.

Moreover, in this embodiment, the dichroic mirror 4 is arranged such that the optical path length of the red light emitted from the LED 31 to the beam splitter is the same as the optical path length of the blue light emitted from the LED 32 to the beam splitter, which facilitates subsequent collimation with a lens or lens set and realizes higher light efficiency.

In a variant of this embodiment, the cavity is provided with 5 or 8, or even 17 sides. As long as the optical paths of the blue light and red light can be perpendicular to each other, the number and shape of sides can be arbitrarily set, and are not limited to the cube and polygonal prism structure of this embodiment.

Embodiment 2

Figure 2:
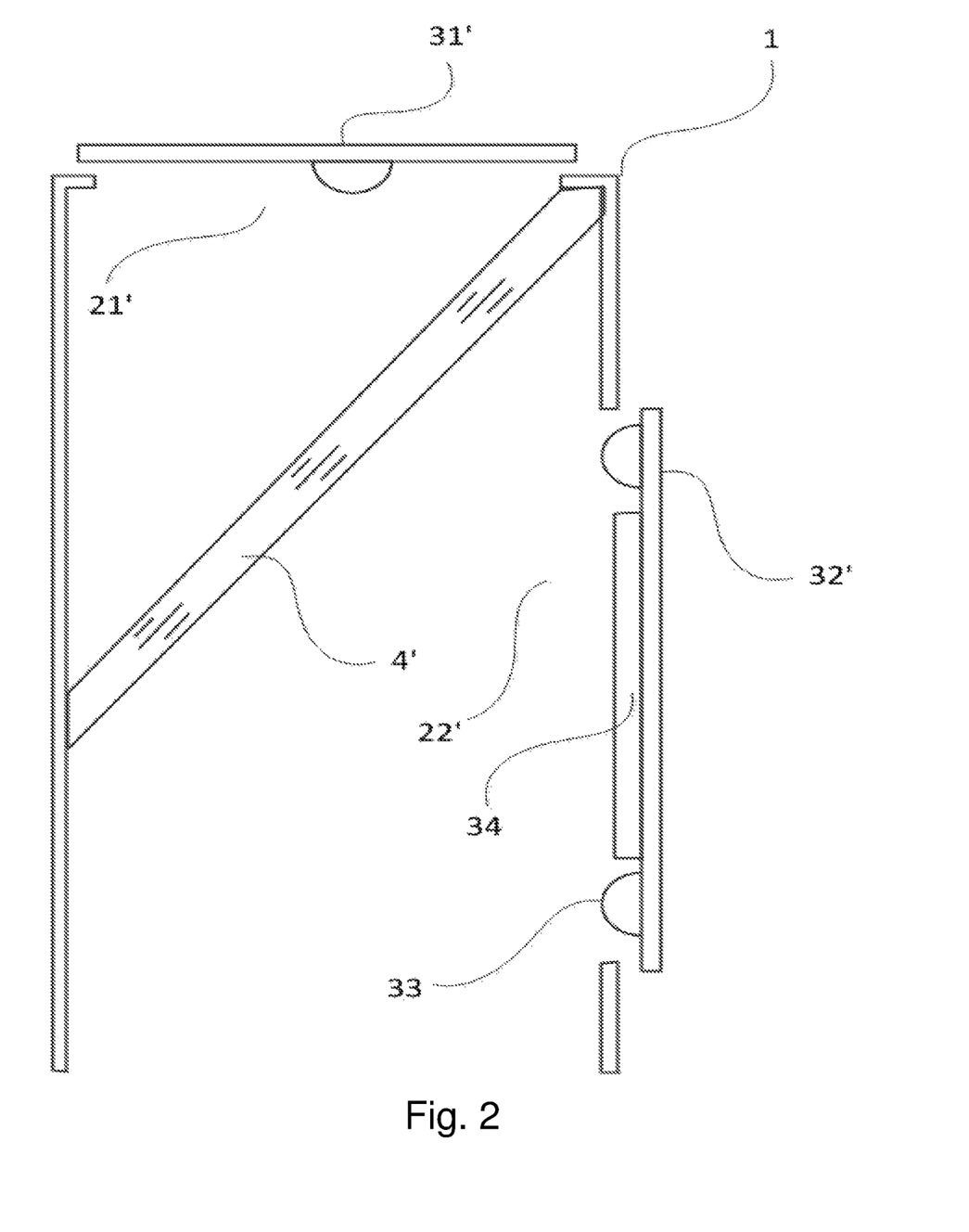
FIG. 2 is a schematic cross-sectional view of an optical structure according to a second embodiment.

As shown in FIG. 2, the cavity 1 in this embodiment is a cylinder. One end of the cavity 1 is open, and an end face of the other end is provided with an elongated gap 21'. An LED board 31' covers the gap 21'. The light emitted from the LED board 31' is emitted toward the opening of the cavity 1 through the gap 21'.

One side of the cavity 1 is provided with an elongated gap 22'. An LED board 32' covers gap 22'. The light emitted from the LED board 32' is emitted through the gap 22' toward the other side in the cavity opposite the gap 22'.

In this embodiment, the LED board 32' is further provided with a photodiode 33, and the photodiode 33 faces the gap 22' to collect the light intensity in the cavity.

In addition, a light barrier 34 is disposed between the second LED 22 and the photodiode 33 to keep a photosensitive surface of the photodiode 33 from direct exposure to the light emitted by the second LED 22, thereby preventing the photodiode from detecting wrong optical signals. A beam splitter 4' is disposed in the cavity 1 in the manner shown in FIG. 2. In this embodiment, the beam splitter 4' can allow about half of the light emitted by the LED board 31' to directly pass through the beam splitter 4', but reflect about half of the light emitted by the LED board 32' by 90 degrees. Then, the light directly passed through and the light reflected by 90 degrees are merged, after which the merged light exits from the opening of the cavity 1.

Moreover, in this embodiment, the beam splitter 4' is also arranged such that the optical path length of the light emitted from the LED board 31' to the beam splitter is the same as the optical path length of the light emitted from the LED board 32' to the beam splitter, which facilitates subsequent collimation with a lens or lens set and realizes higher light efficiency.

Figure 3:
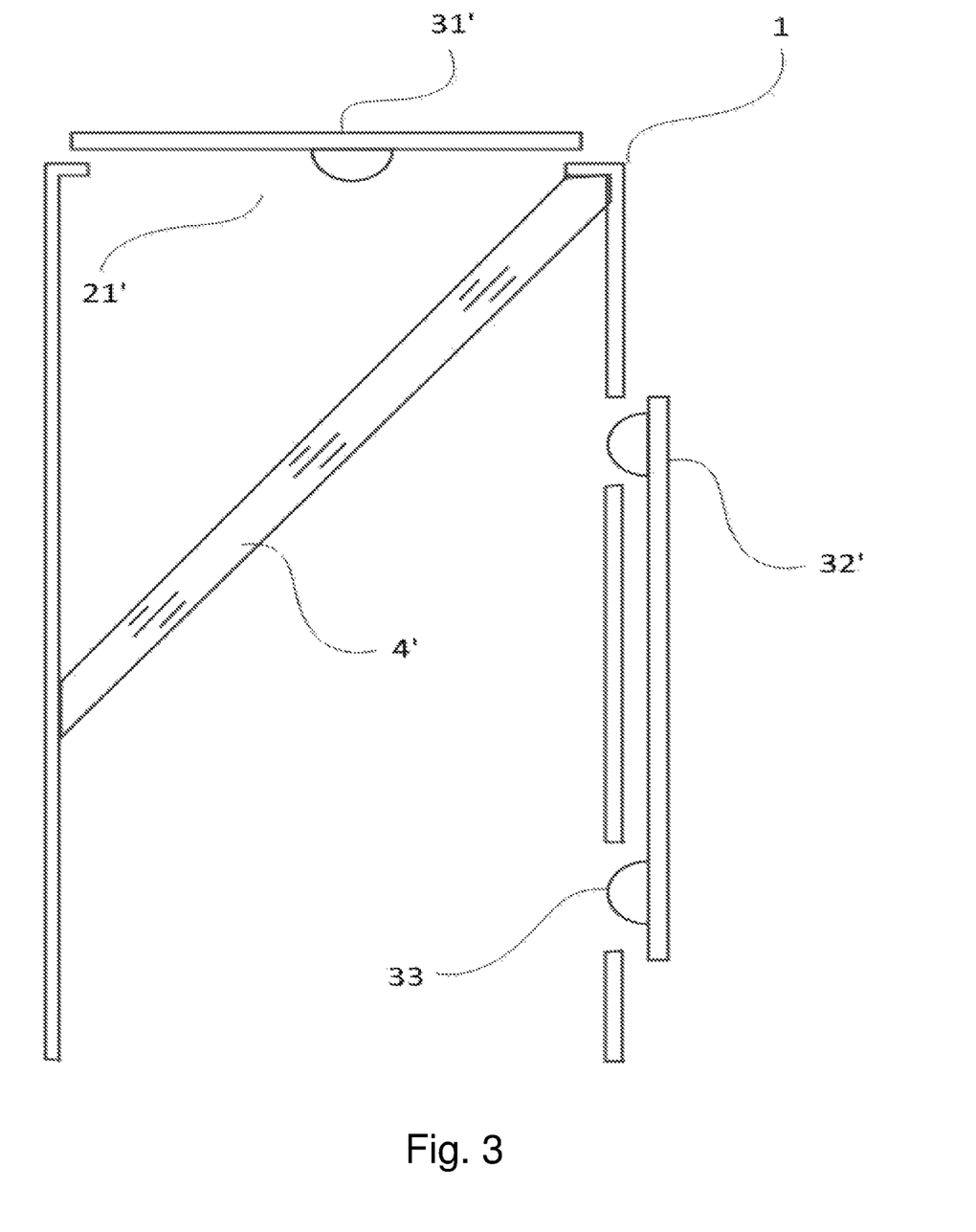
FIG. 3 is a schematic cross-sectional view of an optical structure according to a variant of the present invention.

In a variant of this embodiment, as shown in FIG. 3, the side of the cavity 1 is further provided with a separate through hole for disposing a photodiode to collect the intensity of light in the cavity. In this case, the side wall of the cavity between the through hole and the through hole or gap provided with the second LED acts as a light barrier to keep the photodiode from direct exposure to the light emitted by the second LED. In yet another variant, the side wall of the cavity between the through hole and the through hole or gap provided with the second LED is thickened or a light barrier is additionally disposed in the side wall of cavity, thereby improving the light blocking effect.

In another variant, the side of the cavity 1 is further provided with a gap, and the circuit board where the photodiode is located covers the gap to collect the light intensity in the cavity.

Embodiment 3

Figure 4:
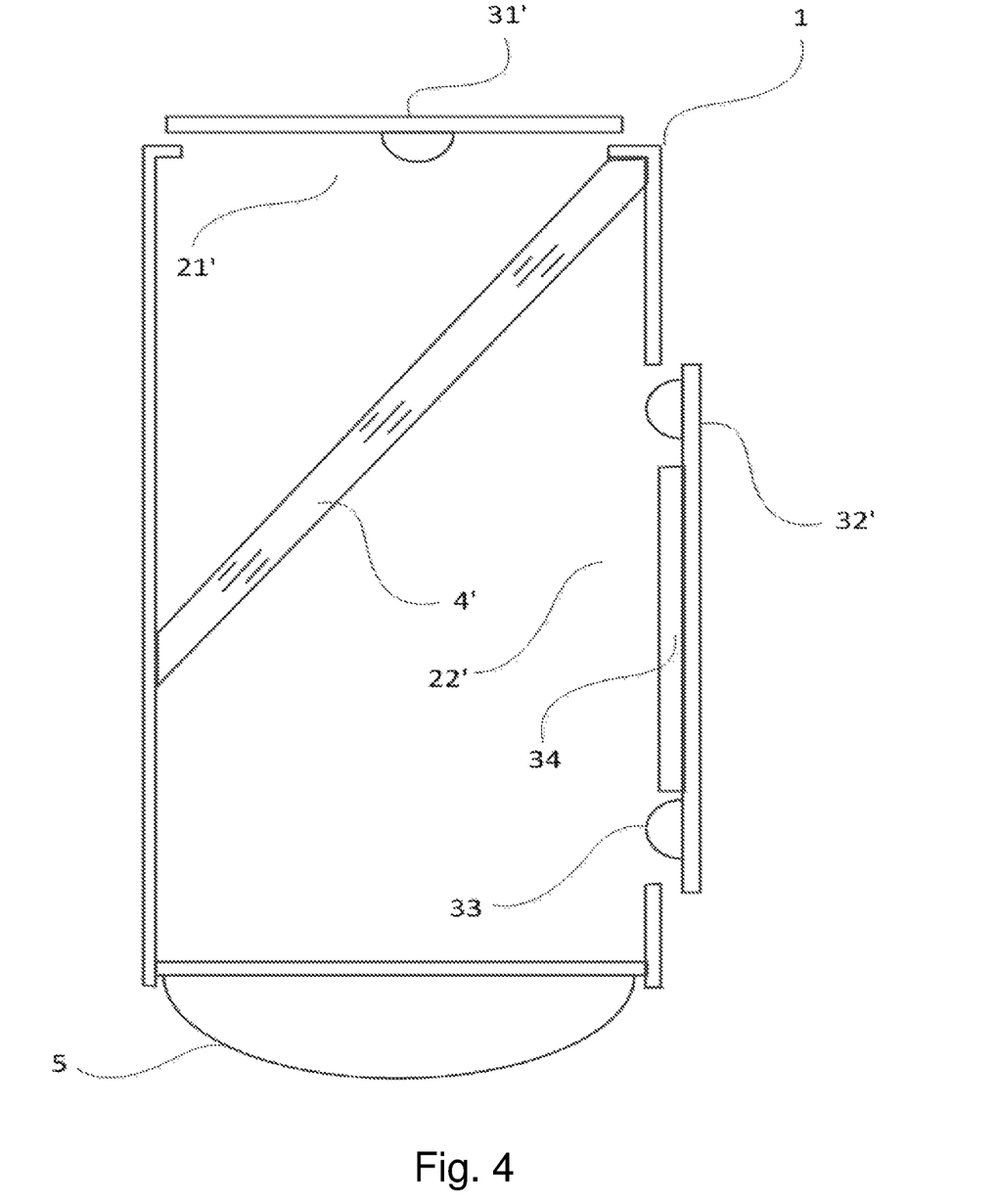
FIG. 4 is a schematic cross-sectional view of an optical structure according to a third embodiment.

As shown in FIG. 4, the difference between this embodiment and embodiment 2 is that a lens 5 is disposed at the opening of the cavity 1 in this embodiment, and the lens 5 collimates the merged light into parallel light or condenses the merged light.

In a variant of this embodiment, the lens may be a lens set to convert the merged light into parallel light or condense the light.

Figure 5:
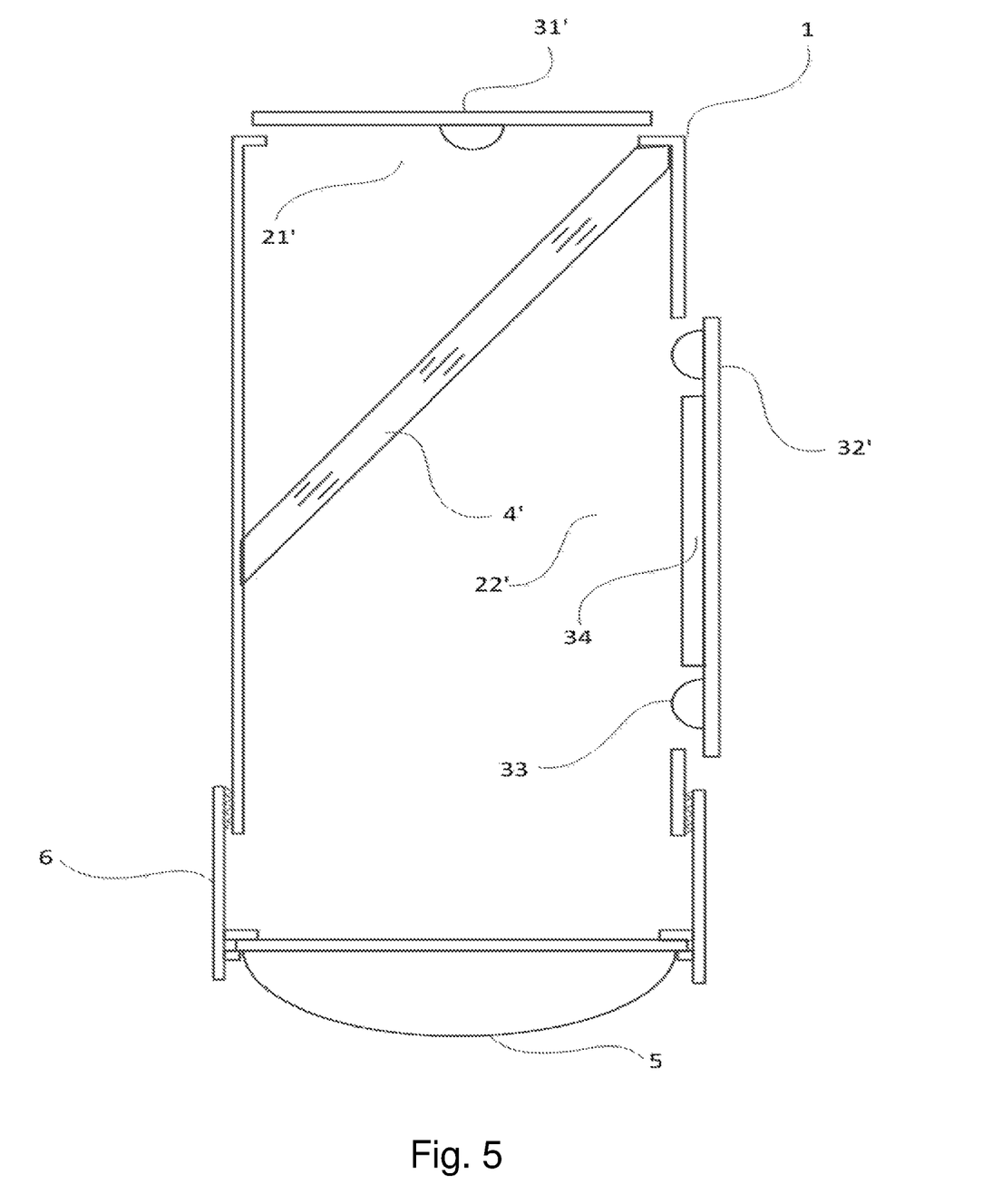
FIG. 5 is a schematic cross-sectional view of an optical structure according to a further embodiment.

In another embodiment shown in FIG. 5, the lens 5 is embedded in a threaded connector 6 mating with a thread at the opening of the cavity 1, so that the threaded connector 6 can be screwed and fixed at the opening.

In another embodiment of this embodiment, the lens or lens set is inserted into the opening of the cavity by snap-fitting and can be removed from the opening of the cavity manually or by means of a tool. The fixing of the lens at the cavity opening can be more conveniently realized by the snap-fitting, and the snap-fitting can also meet the requirement of lens removal.

Figure 6:
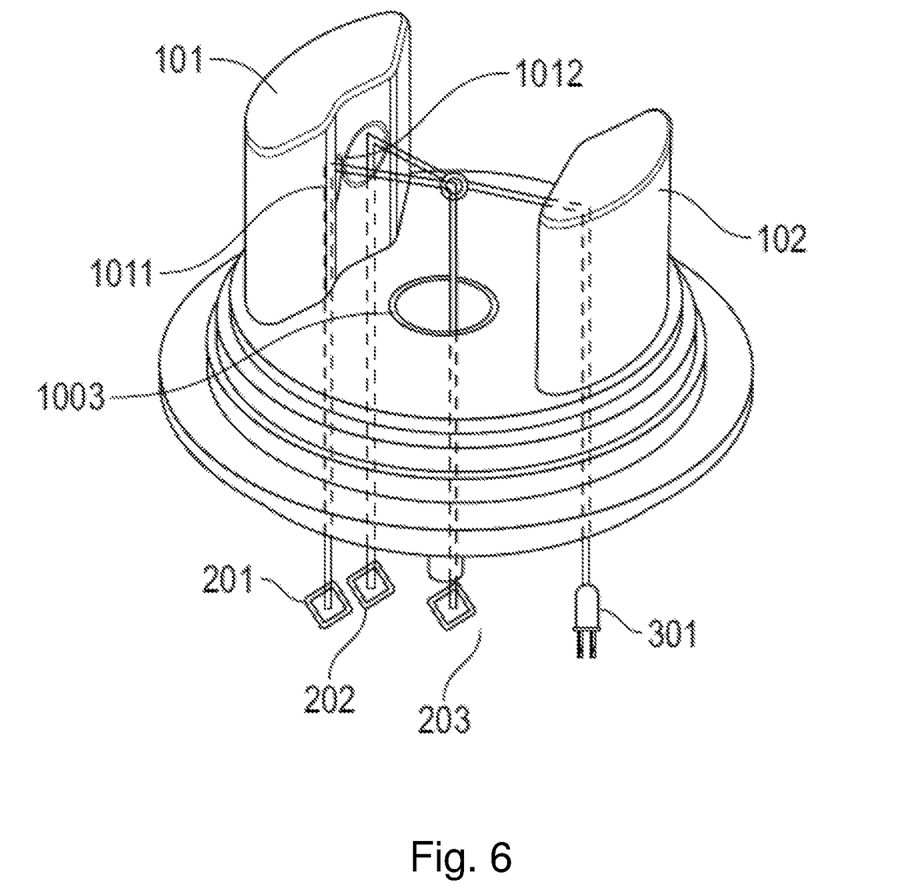
FIG. 6 is a schematic view of a turbidity sensor according to another embodiment of the present invention.

In another embodiment, the optical structure in this embodiment is fitted in a turbidity sensor as light source 301 shown in FIG. 6. The head of turbidity sensor shown in FIG. 6 has two pillars 101, 102. The pillar 102 has one window (not shown in FIG. 6) facing to the window 1011 on the pillar 101. On the pillar 101, one more window 1012 is placed and adjacent to the window 1011. There is another window 1003 is placed in the center of bottom of the head.

The light emitted by light source 301 goes through the window on the pillar 102 leveraging the refractor. After the light is scattered by the medium, like beverage, between the two pillars 101, 102, Part of the scattered light goes through the window 1011 and is refracted by 90 degree to the photosensor 201 in the turbidity sensor. Part of the scattered light goes through the window 1012 adjacent to the window 1011 and is refracted by 90 degree to the photosensor 202. Part of the scattered light is refracted by 90 degree and received by the photosensor 203 through the window 1003 on the bottom of head.

The photosensor 201, 202 and 203 convert the brightness of light they received into digital signals. The turbidity sensor further transfers and calculated the chromaticity and turbidity by the digital signals.

Although specific embodiments of the present invention have been described above, those skilled in the art should understand that these are merely examples, and the scope of protection of the present invention is defined by the appended claims. Those skilled in the art may make various changes or modifications to these embodiments without departing from the principles and essence of the present invention, but all these changes and modifications fall within the scope of protection of the present invention.

What is claimed is:

1. An optical structure, comprising:
 a cavity with an opening provided at an end thereof, a first through hole or gap provided at an end opposite the opening, a second through hole or gap provided along one side of the cavity, and a beam splitter or dichroic mirror positioned internally in the cavity;
 a first light-emitting diode ("LED"), arranged to emit light into the cavity through the first through hole or gap such that the light emitted passes directly through the beam splitter or dichroic mirror and exits from the opening; and
 a second LED, arranged to emit light into the cavity through the second through hole or gap that is provided in one side of the cavity such that the light emitted is reflected by the beam splitter or dichroic mirror and fuses with the light emitted by the first LED, wherein the light emitted by the respective LEDs to the beam splitter or the dichroic mirror has the same optical path length.

2. The optical structure of claim 1, further comprising:
 a photodiode, arranged at a third through hole in the cavity or at the second gap and at a set distance from the second LED.

3. The optical structure of claim 2, further comprising:
 a light barrier, disposed between the photodiode and the second LED to keep the photodiode from direct exposure to the light emitted by the second LED.

4. The optical structure of claim 3, further comprising:
 a first circuit board on which the first LED is provided; and
 a second circuit board on which the second LED and photodiode are provided.

5. The optical structure of claim 1, further comprising:
 a first circuit board on which the first LED is provided; and
 a second circuit board on which the second LED is provided.

6. The optical structure of claim 1, wherein the first LED and the second LED emit light at the same time.

7. The optical structure of claim 1, wherein the first LED and the second LED emit light at different times.

8. The optical structure of claim 1, further comprising:
 a lens or lens set, disposed at the opening of the cavity, to convert the fused light into parallel light or condensed light.

9. The optical structure of claim 8, wherein the lens or lens set is removably disposed at the opening.

10. The optical structure of claim 8, further comprising:
 a connector, threadingly connected at the opening of cavity, to dispose the lens or lens set.

11. The optical structure of claim 1, wherein the light emitted by the first LED has a different wavelength than the light emitted by the second LED.

12. A sensor, comprising:
 an optical structure according to claim 1.

13. The sensor of claim 12, wherein:
 the sensor is a chroma sensor.

14. The sensor of claim 13, wherein:
 the sensor is a turbidity sensor.

15. The sensor of claim 12, wherein:
 the sensor is a combined chroma/turbidity two-in-one sensor.

* * * * *

UNITED STATES PATENT AND TRADEMARK OFFICE
CERTIFICATE OF CORRECTION

PATENT NO. : 10,754,166 B2
APPLICATION NO. : 16/414282
DATED : August 25, 2020
INVENTOR(S) : Wang et al.

Page 1 of 1

It is certified that error appears in the above-identified patent and that said Letters Patent is hereby corrected as shown below:

On the Title Page

Item (30), Foreign Application Priority Data, please insert -- May 19, 2018 (CN) 201810483851.4 --.

Signed and Sealed this
Third Day of November, 2020

Andrei Iancu
*Director of the United States Patent and Trademark Office*